Patented July 1, 1952

2,602,079

UNITED STATES PATENT OFFICE 2,602,079

OXYALKYLATED DERIVATIVES OF RESINOUS POLYMERS OF VINYL ESTERS

Melvin De Groote, University City, and Bernhard Keiser, Webster Groves, Mo., assignors to Petrolite Corporation, Ltd., Wilmington, Del., a corporation of Delaware No Drawing. Application November 12, 1948, Serial No. 59,771

6 Claims. (Cl. 260—89.1)

The present invention is concerned with certain new chemical products, compounds, or compositions which have useful application in various arts. It includes methods or procedures for manufacturing certain new chemical products, compounds or compositions, as well as the products, compounds or compositions themselves. Said new materials or substances are oxyalkylated derivatives of certain polymerized monomers, which monomers, in turn, contain the ethylenic radical, as hereinafter described. This application is a continuation-in-part of our copending application, Serial No. 8,722, filed February 16, 1948, now Patent 2,499,365, granted March 7, 1950.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our copending application Serial No. 59,772, filed November 12, 1948, now Patent 2,499,369, issued March 7, 1950. The new products are useful as wetting, detergent and leveling agents in the laundry, textile and dyeing industries; as wetting agents and detergents in the acid washing of fruit; in the acid washing of building stone and brick; as wetting agents and spreaders in the application of asphalt in road building and the like; as a constituent of soldering flux preparations; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants, etc.

Specifically, the present invention is concerned with certain hydrophile oxyalkylated derivatives of certain organic solvent-soluble polymerized vinyl resins, or polymerized acrylic acid, or substituted acrylic acid resins, or resinous polymers, as hereinafter described. The preparation of such oil-soluble polymers is well known. Subsequently, there is described a method of oxyalkylating such polymers, and particularly, their oxyethylation. The oxyalkylating compounds employed are alpha-beta olefine oxides having not over 4 carbon atoms and selected from the class consisting of ethylene oxide, propylene oxide, butylene oxide, glycide and methylglycide. Having obtained such oxyalkylated derivatives, they are employed as demulsifiers, as hereinafter described.

The new compounds or compositions which form the present invention are obtained by the oxyalkylation of certain polymerized ethylenic monomers containing an ester radical. Such monomers may be indicated by the following formula:

It will be noted that in both instances the monomer is an ester. In one instance the ethylenic radical is attached to the carbonyl carbon atom of an ester radical; in the other instance, it is attached to the oxygen atom of an oxyacyl radical. In either instance, R must contain at least 5 and not over 20 carbon atoms. Note particularly that U. S. Patent No. 2,091,627 describes oil-soluble polymers derived from monomeric esters of acrylic acid or its alpha-alkyl or alpha-aryl substitution products, by combination with monohydric alcohols containing more than 4 carbon atoms, such as the amyl, hexyl, heptyl, octyl, nonyl, decyl, lauryl, or octadecyl esters of acrylic acid. The esters described in said aforementioned U. S. Patent No. 2,091,627 are particularly those of the normal, primary saturated aliphatic alcohols, but also suitable are the analogous esters of the corresponding secondary or branched chain alcohols.

As to the second class of esters, those in which the ethylenic radical is present in the alcoholic part of the ester, attention in said patent is directed to the vinyl esters of heptoic acid, lauric acid, palmitic acid, stearic acid, etc.

The article appearing in the Journal of American Chemical Society, volume 69, 2439 (1947), additionally describes the preparation of vinyl esters of higher fatty acids employing vinyl acetate and oleic acid.

Having obtained the ethylenic ester monomer, as described previously, the process of polymerization consists essentially of adding approximately one-half of 1% of benzoyl peroxide to the ester and heating at 100° to 110° C. for 10 to 24 hours until one obtains a polymer which is still oil-soluble, and is sub-rubbery in the sense that it has not reached the rubbery stage. Molecular weight determination of the polymers herein described, indicates that they are resins having at least 3 or more units. As a matter of fact, the number of units per resin molecule, seems to be substantially higher, several times this initial trimeric stage. Any unpolymerized monomer can be removed by vacuum distillation, but this is not necessary. The same method of polymerization can be adapted to vinyl esters of lauric acid, palmitic acid, stearic acid, oleic acid, etc. Such polymerization is described in the aforementioned U. S. Patent No. 2,091,627.

Having obtained such water-insoluble, oil-soluble, viscous heat polymerized product, from an ester such as the amyl, hexyl, nonyl, lauryl, octyl, or octadecyl ester of acrylic acid, or methacrylic acid, or the vinyl ester of lauric acid, palmitic acid, stearic acid, oleic acid, etc., the next step simply involves the oxyalkylation of such polymer.

Compounds generally subjected to oxyalkylation are characterized by reactive hydrogen atoms, i. e., hydrogen atoms attached to oxygen, nitrogen or sulfur. Specifically, such compounds are acids, alcohols, phenols, mercaptans, ammonia, primary amines, secondary amines, amides, etc. In some instances, compounds not having a labile hydrogen atom still may be susceptible to oxyalkylation and particularly oxyethylation. This is true of compounds having ester linkages. In such instances apparently the alkylene oxide enters as a divalent radical at the carbonyl carbon atom or at the acyl oxygen atom. We have found that the water-insoluble polymerized esters herein described are susceptible to reaction with an alkylene oxide, particularly ethylene oxide, so that the resultant products become water-dispersible or water-soluble and as such are valuable for numerous purposes, particularly demulsification. The exact reaction which takes place is not known. In a co-pending application filed by one of the present applicants, Serial No. 59,769, filed November 12, 1948, there is an analogous reaction in which an ester of an amino-alcohol, free from a labile hydrogen atom, is subjected to oxyalkylation. In examining the mechanism of the reaction, which is the same as the present one, insofar that an ester group is attached by an alkylene oxide, particularly ethylene oxide, the following appears in verbatim form in the aforementioned application.

"Re-examining the last formula previously referred to, it is to be noted that such product does not contain a reactive hydrogen atom. I have found, however, that such ester of an amino-alcohol, even though water-insoluble and showing no appreciable tendency to emulsify prior to treatment with an alkylene oxide, can be treated with an alkylene oxide, particularly ethylene oxide, so as to obtain a water-soluble product which seems to be a mixture, and the exact nature of which is not known at the moment. Presumably, in part, the product would appear to be the resultant of a reaction where the ethylene oxide enters at the carbonyl carbon position in a manner indicated in the following way:

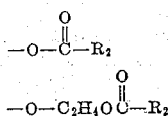

There would be no difference, of course, if the ethylene oxide were considered as entering between the radical R₁ and the adjacent oxygen atom. This is shown in the following:

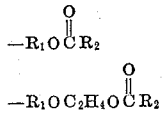

"Actually, it is believed that the reaction which takes place is somewhat more complex than the simpler suggestions previously presented. For instance, there may be a rupture involving one fragment at the carbonyl carbon atom and another fragment at the adjoining oxygen atom. This is shown in the following manner:

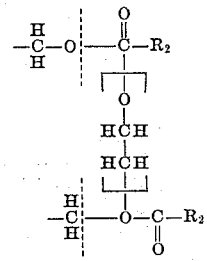

"Assuming that part of the reaction or reactions may be explained by a rupture, as above indicated, it is a matter of further speculation as to what happens to the two aminoalcohol residues, as differentiated from the acyl and acyloxy residues. The two might simply unite, as indicated in the following manner:

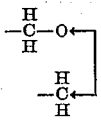

or it might be possible, of course, that another mole of ethylene oxide furnishes a connective divalent radical, as indicated in the following:

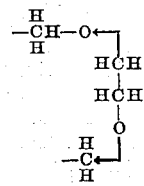

"The fact that the resultant obtained from a single ester does not always yield products which are uniform, and also the fact that comparable materials prepared by increased oxyethylation of the secondary amine prior to esterification acts somewhat differently, both as emulsifiers for oil-in-water emulsions and as demulsifiers for water-in-oil emulsions, indicate that even though I do not know the composition completely, it probably represents, at least in part, other reaction products in addition to those which have been briefly indicated."

Previous reference has been made to the higher fatty acids, and particularly the saturated higher fatty acids. The higher fatty acids include caprylic acid, capric acid, lauric acid, myristic acid, palmitic acid, stearic acid, as well as hydroxystearic acid, dihydroxystearic acid, trihydroxystearic acid, etc., as well as the unsaturated higher fatty acids, such as oleic acid, linoleic acid, linolenic acid, ricinoleic acid, etc.

There may be an anomaly in the fact that reference has been made to the absence of reactive hydrogen atoms in the ester which is subjected to oxyalkylation, and at the same time esters of ricinoleic acid, hydroxystearic acid, and the like have been included. Ethylene oxide reacts with primary alcohols. Apparently, however, under ordinary conditions of reaction, or even under the more drastic conditions of reaction herein described, ethylene oxide or the other alkylene oxides, do not react with the secondary alcoholic radical which is part of an acyl radical, as in the case of ricinoleic acid, hydroxystearic acid, etc. In fact, if ricinoleic acid or ethyl ricinoleate is subjected to oxyalkylation, particularly oxyethylation, one does not obtain a compound in which the alcoholic hydroxyl of the ricinoleyl radical has been attacked.

The same applies in connection with the compounds herein described, if one happens to employ an ester in which the ricinoleyl or similar group is present. If the final product is subjected to saponification and then acidified and extracted so as to recover the fatty acid as such, examination of it reveals that it is the unaltered original fatty acid and not the fatty acid of the following type:

$$H(OR_1)_nOR_3COOH$$

wherein $R_1O$ represents a divalent alkylene oxide radical and $HOR_3COOH$ represents ricinoleic acid, hydroxystearic acid, or the like.

*Example 1a*

| | Grams |
|---|---|
| Lauryl methacrylate | 250 |
| Xylene | 100 |
| Benzoyl peroxide | 1.25 |

The lauryl methacrylate was mixed with the xylene and shaken with 250 cc. of a 1% solution of caustic soda to remove the inhibitor. This was followed by three shakes with 100 cc. each of distilled water to remove the caustic. The product was then filtered through dry filter paper to remove any trace of moisture still suspended. 2.5 grams of benzoyl peroxide were then added as a polymerization catalyst. The mixture was refluxed for 14 hours. During this period of time the product became more viscous and the increase in viscosity was particularly noticeable when cold. At the end of the polymerization period the xylene solution had a viscosity comparable to or in excess of castor oil, i. e., between that of castor oil and blown castor oil. The final product obtained had slightly less than 30% of xylene. This solution was then tested for the presence of benzoyl peroxide before subjecting to oxyalkylation. In no instance was benzoyl peroxide to be present, provided refluxing and continued for at least 6 to 8 hours, and preferably, over 10 hours. If, in any similar experiment, benzoyl peroxide is present, it should be eliminated by the usual conventional procedures before the oxyalkylation step.

*Example 2a*

The same procedure was followed as in Example 1a, except that decylmethacrylate was employed. The time required for polymerization was 16 hours.

*Example 3a*

The same procedure was followed as in the preceding examples, except that cetyl methacrylate was employed, and the time required for polymerization was about 18 hours.

*Example 4a*

The same procedure was followed as in Example 1a, except that octadecyl methacrylate was employed and the time required for polymerization was 20 hours.

*Example 5a*

The same procedure was followed as in Example 1a except that laurylacrylate was used, and the time required for polymerization was 14 hours.

*Example 6a*

The same procedure was followed as in Example 1a, except that cetylacrylate was used and the time required for polymerization was 16 hours.

*Example 7a*

The same procedure was followed as in Example 1a, except that octadecyl acrylate was used, and the time required for polymerization was 19 hours.

*Example 8a*

The same procedure was followed as in Example 1a, except that vinyl laurate was used, and the time required for polymerization was 22 hours.

*Example 9a*

The same procedure was followed as in Example 1a, except that vinylstearate was used, and the time required for polymerization was 18 hours.

*Example 10a*

The same procedure was followed as in Example 1a, except that vinyl palmitate was used, and the time required for polymerization was 21 hours.

*Example 11a*

The same procedure was followed as in Example 1a, except that oleylacrylate was used, and the time required for polymerization was 12 hours.

*Example 12a*

The same procedure was followed as in Example 1a, except that oleyl methacrylate was used, and the time required for polymerization was 15 hours.

It is to be noted that the above conditions of polymerization may vary considerably, even with the same monomeric compound. It may sometimes happen that the use of caustic does not remove all the inhibitor. Sometimes the period of incubation prior to polymerization seems to vary with the particular sample of benzoyl peroxide used. The main point to bear in mind in the polymerization process is that the objective is to obtain a solvent-soluble, particularly xylene-soluble, polymer, which will exhibit a viscosity, when mixed with one-half or one-third its weight of xylene, of approximately castor oil or somewhat in excess thereof, i. e., approximately the viscosity of blown castor oil. In some instances, certain samples may show this viscosity in a major fraction of the time above indicated. In other words, the time required may be one-half to one-third the period of time indicated. At other times, it may require somewhat longer, i. e., one-fifth to one-third longer. If increased length of time does not produce the appropriate state of polymerization, then the experiment should be repeated, using a slightly increased amount of benzoyl peroxide up to ¾ of 1%, or thereabouts, or using a higher temperature of polymerization, such as substituting xymene for xylene. Similarly, if the polymerization goes too far, the time of polymerization should be cut down or less peroxide used, or a lower temperature employed, for instance, using toluene instead of xylene. The appearance of these products was not only similar to castor oil or blown castor oil in viscosity, but it was also similar in color, i. e., yellow or yellowish-amber in color.

Such experimentation demands nothing more than routine variation. It is to be noted that the final stage of polymerization is not critical. All that is required is that the product be water-insoluble, and its solution in an aromatic solvent within the ratios indicated above be within the range specified, and finally that the product be susceptible to oxyalkylation, without becoming insoluble or rubbery. This latter property is best determined upon a particular sample by an actual oxyalkylation procedure on a pilot plant scale.

*Example 1b*

The xylene solution of polymerized lauryl methacrylate described under the heading of Example 1a, containing slightly less than 30% xylene, was employed. The amount used was 325 grams. 4 grams of sodium methylate were added to the solution and placed in a stirring autoclave and 400 grams of ethylene oxide introduced in four portions of 100 grams each. Initially, 100 grams of ethylene oxide were added and the product stirred for six hours at 160° C. The maximum gauge pressure was 150 pounds. At the end of this reaction period, the pressure dropped to merely that of xylene. At the end of the initial reaction period, the product was as viscous as before, but showed a definite tendency to emulsify in water. The second addition of ethylene oxide was then made and the same temperature was employed; the time required for reaction was five hours, and the maximum gauge pressure was 180 pounds. At this point, two more grams of sodium methylate were added in order to set up the reaction. At the end of this second period, the product was still a viscous liquid and was water-emulsifiable. A third addition of ethylene oxide was then made. This addition required 6½ hours at a maximum temperature of 165° C. The maximum pressure was 170 pounds per square inch gauge pressure. At the end of this period the product was still viscous and produced a milky emulsion on shaking with distilled water. The final addition of ethylene oxide was made in six hours, employing a maximum temperature of 150° C. and a pressure of 165 pounds per square inch. The color of the product darkened during this last period and the viscosity remained about the same. There was some tendency to show stringiness or lumpiness. The final product was completely emulsifiable in water and produced an excellent but turbid emulsion.

*Example 2b*

The same procedure was followed as in Example 1b, except that the polymerized resin solution employed was that described under the heading of Example 3a, preceding. The conditions of oxyethylation were sustantially the same, i. e., four additions of 100 grams each of ethylene oxide, using a temperature of 150° to 165° C. In each instance, the time required varied from 5 to 6½ hours for each addition. The maximum gauge pressure varied from 150 pounds to 185 pounds and the amount of catalyst employed was 2¼%, based on the weight of the resin, excluding the xylene.

*Example 3b*

The same procedure was followed, using the product of Example 4a, preceding. The conditions of oxyethylation were substantially the same, i. e., four additions of 100 grams each of ethylene oxide, using a temperature of 150° to 165° C. In each instance, the time required varied from 5 to 6½ hours for each addition. The maximum gauge pressure varied from 150 pounds to 185 pounds and the amount of catalyst employed was 2¼%, based on the weight of the resin excluding the xylene.

The equivalent amount of any alkylene oxide, as previously pointed out, can be substituted for ethylene oxide. Propylene oxide, for example, gives decidedly less solubility, based on equal molar equivalents, than ethylene oxide. Glycide and methylglycide are entirely satisfactory and impart a definite hydrophile properly comparable to ethylene oxide, based on equal molal ratios. However, the use of glycide is extremely hazardous and it is our preference to use either ethylene oxide or a combination of ethylene oxide, or propylene oxide. We know of no instance where the compounds obtained from these particular resins and using any other oxide, other than ethylene oxide, are any better or more economical. In other words, of all the alkylene oxides noted, it is our definite preference to use ethylene oxide, due to lower cost, and speed of reaction. Propylene oxide, for example, is much less reactive and generally requires greater time for oxyalkylation.

In some instances, the products starting with soluble resins, yield insoluble products which do not show marked surface activity. In such instances, if insolubilization or rubberiness takes place during oxyalkylation, it is desirable to repeat the experiment, using a less highly polymerized initial resin.

Previous attention has been directed to the fact that the polymerization required is trimeric, or being in all likelihood considerably higher than the trimeric state, as indicated by even an approximate molecular weight determination and the enormous increase in viscosity over the monomer. Such limitation is incorporated into the claims. Furthermore, in the claims the product is not only designated as being hydrophile, but at least hydrophile to the extent that the product will mix with several times its volume of distilled water at ordinary temperature, for instance, 2 to 10 times the volume of distilled water, to give a milky suspension. This test can be made with the aromatic solvent present, as indicated. Our experience has been where these products are soluble in aromatic solvents, they are also soluble in other organic solvents, such as petroleum fractions, chlorinated hydrocarbons, mixtures incorporating ether alchols, etc.

Having thus described our invention, what we claim as new and desire to secure by Letters Patent is:

1. Hydrophile synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble resinous polymer obtained by the polymerization of a monomer selected from the class consisting of compounds of the following structure:

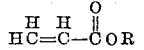

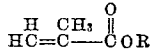

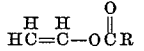

in which R is a radical having at least 5 and not more than 20 carbon atoms selected from the group consisting of aliphatic hydrocarbon radicals and aliphatic hydrocarbon radicals having from 1 to 3 hydrogen atoms replaced by secondary hydroxyl groups, said radical being free from reactive hydrogen atoms; said state of polymerization being at least trimeric and said hydrophile properties being at least sufficient to produce a milky suspension when shaken with several volumes of distilled water, and being due to the introduction of oxyalkylene groups.

2. The product of claim 1, wherein R is a saturated aliphatic radical.

3. Hydrophile synthetic products, said hydrophile synthetic products being oxyethylation products of ethylene oxide and an oxyethylation-susceptible, fusible, organic solvent-soluble, water-insoluble, resin obtained by the polymerization of a polymer selected from the class consisting of compounds of the following structure:

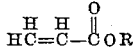

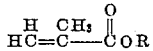

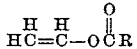

in which R is a saturated aliphatic hydrocarbon radical having at least 5 and not over 20 carbon atoms; said state of polymerization being at least trimeric and said hydrophile properties being at least sufficient to produce a milky suspension when shaken with several volumes of distilled water, and being due to the introduction of oxyethylene groups.

4. The product of claim 3, wherein the selected monomer has the following structure:

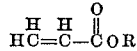

5. The product of claim 3, wherein the selected monomer has the following structure:

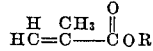

6. The product of claim 3, wherein the selected monomer has the following structure:

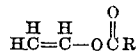

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,434,179 | Sharkey | Jan. 6, 1948 |